July 24, 1956 E. O. KEIZER 2,756,327
TELEVISION RECEIVER GATED AUTOMATIC GAIN CONTROL WITH LOCKOUT PREVENTION
Filed Sept. 12, 1952
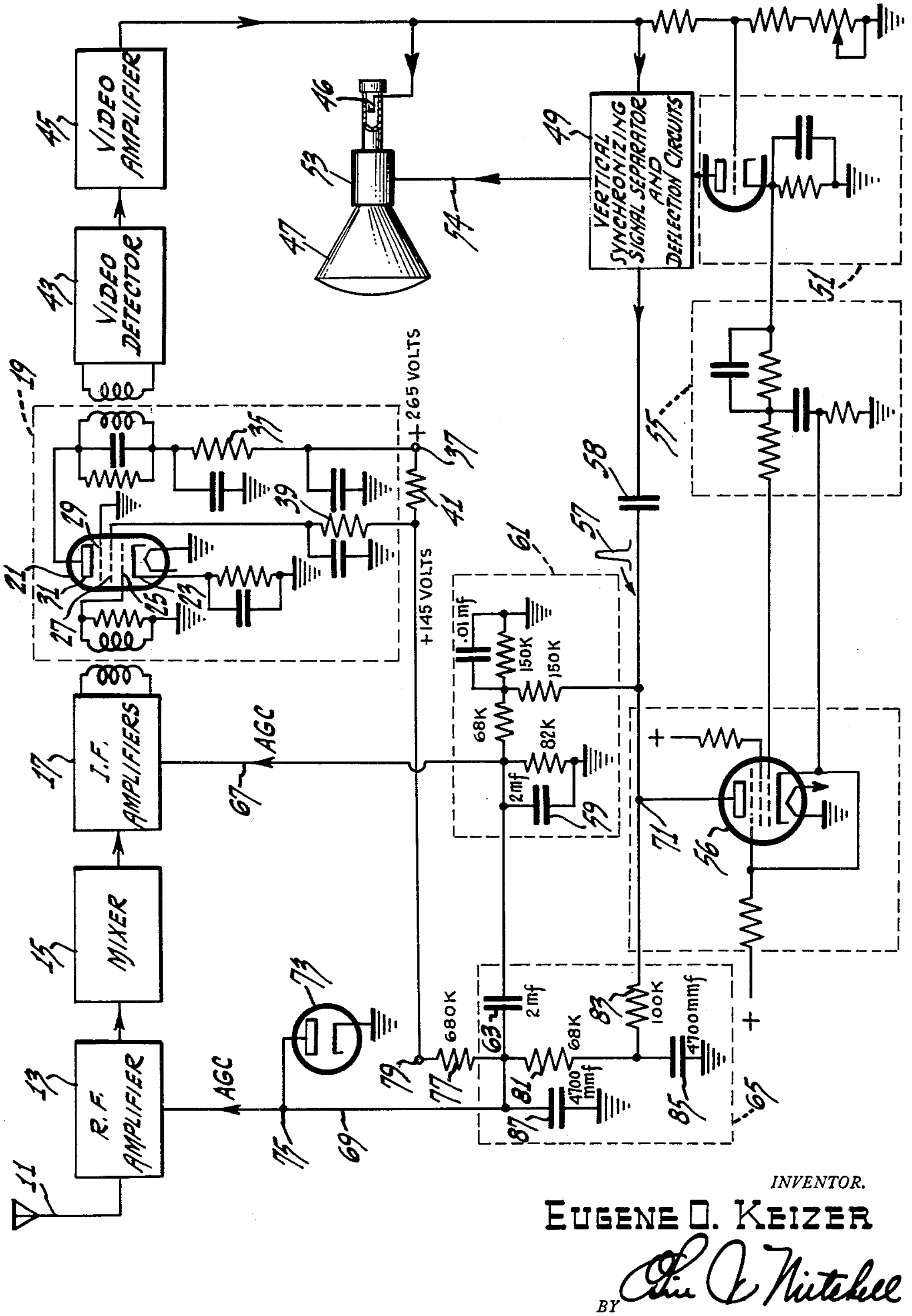
INVENTOR.
EUGENE O. KEIZER
BY Olin V. Mitchell
ATTORNEY 2,756,327

TELEVISION RECEIVER GATED AUTOMATIC GAIN CONTROL WITH LOCKOUT PREVENTION

Eugene O. Keizer, Princeton, N. J., assignor to Radio Corporation of America, a corporation of Delaware Application September 12, 1952, Serial No. 309,189

4 Claims. (Cl. 250—20)

This invention relates to television receivers, and more particularly to means to avoid "lock out" in such receivers.

"Lock out" is a condition of plate saturation in one or more of the I. F. amplifiers of the receiver. This condition may result in a complete loss of synchronizing information, with a consequent loss of the television picture.

"Lock out" can occur, for example, when receiving a very strong signal representing a predominantly white picture, particularly if the transmitter modulation is high. Another example of a condition which may give rise to "lock out" is when a receiver switches from a weak to a strong station.

Since "lock out" is a condition of plate saturation in one or more of the I. F. amplifiers, the way to remedy it is to reduce the gain in the I. F. and/or R. F. amplifiers of the receiver.

It is an object of this invention to provide means to avoid "lock out" in television receivers having an automatic gain control circuit, and to do so at a minimum cost to the manufacturer of television receivers.

According to the present invention, a television receiver includes means to detect the presence of "lock out" and means to reduce the gain of the receiver when "lock out" occurs. These means include a resistor connected from an electron collecting electrode of one of the I. F. amplifier tubes to the output terminal of the automatic gain control circuit. When "lock out" occurs, the potential at the electron collecting electrode falls, and this fall of potential, applied to the output terminal of the automatic gain control circuit, changes the automatic gain control potential so as to reduce the gain of the receiver.

Other and incidental objects of the present invention will be apparent to those skilled in the art from a reading of this specification and an inspection of the accompanying drawing which shows a television receiver which includes an embodiment of the present invention.

Referring to the drawing, the present invention is shown applied to a television receiver which is represented by a combination block and circuit diagram. A complete circuit diagram of the receiver to which the invention is applied may be found in Service Data for RCA Victor Television Receivers Models 17T153, 17T155, 17T160, 17T174, Chassis Nos. KCS66 or KCS66A, 1951 No. T7, prepared by RCA Service Co., Inc., for Radio Corporation of America, RCA Victor Division, Camden, N. J., U. S. A.

The receiver shown in the drawing includes an antenna 11, and a chain of amplifiers for the modulated television signal, this chain comprising a radio frequency (R. F.) amplifier stage 13, a mixer 15, and I. F. amplifiers 17 and 19. The I. F. amplifier 19 is shown in detail and includes a unilateral conduction device 21 having a cathode 23, a control grid 25, a screen grid 27, a suppressor grid 29 and an anode 31.

The potential for the anode 31 is applied thereto through resistor 35 from a source of positive potential shown at point 37, and the screen grid potential is obtained through resistors 39 and 41.

The output of the I. F. amplifier 19 is applied to the video detector 43, which is connected to the video amplifier 45. The output of the video amplifier 45 is applied to the cathode 46 of the kinescope 47, to the synchronizing and deflection circuits indicated in the drawing by box 49, and to the horizontal synchronizing signal separator 51. The vertical synchronizing and deflection circuits 49 includes the vertical synchronizing signal separator and the horizontal and vertical deflection circuits. These deflection circuits generate deflection voltages which are applied to the yoke 53 by means of lead 54.

The horizontal synchronizing signal separator 51 is connected through a filter 55 to the control grid of an automatic gain control tube 56. Positive pulses 57 are applied to the anode of the automatic gain control tube 56 through capacitor 58. These pulses may be derived from the horizontal deflection circuit included in box 49.

The automatic gain control tube 56 conducts during the application of pulses 57, and the amount of conduction is a function of the potential at its control grid, which depends on the potential at the output of the synchronizing signal separator 51. This potential is a function of the strength of the incoming signal.

When the conduction through tube 56 takes place, a negative charge is accumulated on capacitor 59 of AGC filter 61 and on capacitor 63 of AGC filter 65. The stronger the incoming signal, the greater the conduction through tube 56, and the greater the negative charge on capacitors 59 and 63. The negative charge on capacitor 59 is used to control the gain of the I. F. amplifiers 17 by means of lead 67, and the negative charge on capacitor 63 is used to control the gain of the R. F. amplifier 13 by means of lead 69.

The automatic gain control arrangement shown in the drawing is such that a rather large amount of negative potential is developed at point 71, the anode of the AGC tube 56. A relatively small fraction of this negative potential is applied to the gain controlled I. F. amplifiers 17; while a much greater portion is used to control the R. F. amplifier 13. However, the biasing of the R. F. amplifier is delayed until the signal level at the mixer 15 is well above the noise level of the mixer tube. This is done to reduce the "snow" in the picture.

This delay is obtained by connecting point 75 to the plate of a diode 73 whose cathode is grounded. Lead 69 is also connected through a resistor 77 to a source of positive potential at point 79. Resistors 81 and 83 are also connected between point 71 and lead 69, with capacitors 85 and 87 to provide filtering. The diode at point 75 prevents the potential there from going positive, so that this potential stays at about ground potential until sufficient potential is developed at point 71 to make the potential at point 75 go negative. With the values shown, about 36 volts of negative potential are required at point 71 before the potential at point 75 begins to go negative. In accordance with the illustrated embodiment of the present invention, point 79 is not connected to a source of fixed potential, but is connected to an electron collecting electrode of one of the I. F. amplifier tubes. When "lock out" occurs, the I. F. amplifier tube is saturated and the potential of the electron collecting electrode 27 drops to about half its normal value of +145 volts. This drop in potential also occurs at point 79 and reduces the delay on the R. F. amplifier bias, thus reducing the gain of the R. F. amplifier 13 to a point where the "lock out" condition is overcome.

Thus, applicant has provided an automatic and inexpensive way of avoiding "lock out" in television receivers.

Having thus described the invention, what is claimed is:

1. A television receiver adapted to receive and demodulate a modulated television signal and comprising: an amplifier chain for the modulated signal comprising at least two amplifiers, said amplifiers having an electron collecting electrode, a demodulator connected to said amplifier chain, an automatic gain control tube having an input electrode and an output electrode, means to connect the demodulator to the input electrode of said automatic gain control tube, a filter network including a first resistance to connect the output electrode of said automatic gain control tube to one of the amplifiers of said chain, and a second resistance connected between the electron collecting electrode of the other of said amplifiers and the end of said first resistance remote from the output electrode of said automatic gain control tube.

2. A circuit according to claim 1 wherein a unilateral conduction device is connected between a point intermediate said first and second resistances and ground.

3. A television receiver adapted to receive and demodulate a modulated television signal and comprising: an amplifier chain for the modulated signal comprising a radio-frequency amplifier and at least two intermediate frequency amplifiers, said intermediate frequency amplifiers each having an electron collecting electrode, a demodulator connected to said amplifier chain, an automatic gain control tube having an input electrode and an output electrode, means to connect the demodulator to the input electrode of said automatic gain control tube, a first filter network including a first resistance to connect the output electrode of said automatic gain tube to said radio frequency amplifier, a second filter network including a second resistance to connect the output of said automatic gain control tube to one of said intermediate frequency amplifiers, and a third resistance connected between the electron collecting electrode of the other of said intermediate frequency amplifiers and the end of said first resistance remote from the output electrode of said automatic gain control tube.

4. In a television receiver adapted to receive and demodulate a modulated television signal having a synchronizing component defined by carrier excursions of maximum amplitude, comprising in combination: a power supply means; an amplifier chain for the modulated signal operatively connected with said power supply means comprising a first and second cascade amplifiers, said second amplifier having an electron collecting electrode, said second amplifier being subject to fortuitous conditions of overload upon the application of signals to the input circuit of said second amplifier which exceed a given amplitude, said overload conditions tending to produce saturation in said second amplifier resulting in attenuation of said synchronizing component and the establishment of lock-out in said receiver, said second amplifier being further characterized in the provision of a dropping resistor connected between said collecting electrode and power supply means such that a characteristic voltage drop is developed across said dropping resistor upon an increase in current passed by said collecting electrode, the current demands of said collecting electrode increasing sharply under the conditions of said amplifier overload; means connected with at least one of said amplifiers for altering the gain of said amplifier chain; a demodulator connected to said amplifier chain; an automatic gain control circuit having an input and an output terminal, said automatic gain control circuit including means responsive to the synchronizing component of television signals to develop a gain control voltage; means connecting demodulator output signal to the input terminal of said automatic gain control circuit; means connecting the output terminal of said automatic gain control circuit to said amplifier gain altering means such as to vary the gain of said amplifier chain as a function of said gain control voltage; and a resistance connected between the electron collecting electrode extremity of said dropping resistor and said gain altering means of a value conveying the increase in voltage drop across said dropping resistor characterized by overload conditions in a gain reducing polarity to said gain altering means with such a resultant reduction in gain as to prevent lock-out in said receiver.

References Cited in the file of this patent

UNITED STATES PATENTS

| | | |
|---|---|---|
| 2,079,657 | Mountjoy | May 11, 1937 |
| 2,172,160 | Dome | Sept. 5, 1939 |
| 2,185,612 | Trevor | Jan. 2, 1940 |